United States Patent
Yang

(10) Patent No.: US 7,450,491 B2
(45) Date of Patent: Nov. 11, 2008

(54) MULTICARRIER AND MULTIRATE CDMA SYSTEM

(75) Inventor: Guu-Chang Yang, Taichung (TW)

(73) Assignee: Accton Technology Corporation, Hsinchu (TW)

( * ) Notice: Subject to any disclaimer, the term of this patent is extended or adjusted under 35 U.S.C. 154(b) by 860 days.

(21) Appl. No.: 10/859,136

(22) Filed: Jun. 3, 2004

(65) Prior Publication Data
US 2005/0157686 A1    Jul. 21, 2005

(30) Foreign Application Priority Data
Jan. 15, 2004    (TW) .............................. 93101079 A

(51) Int. Cl.
*H04J 11/00* (2006.01)
(52) U.S. Cl. ...................................... 370/208; 370/320
(58) Field of Classification Search ................. 370/208, 370/329, 209, 320, 479; 375/130, 136
See application file for complete search history.

(56) References Cited

U.S. PATENT DOCUMENTS

| | | | |
|---|---|---|---|
| 2003/0058788 A1* | 3/2003 | Kim et al. | 370/208 |
| 2003/0086365 A1* | 5/2003 | Horne | 370/208 |
| 2007/0258593 A1* | 11/2007 | Helper | 380/268 |

* cited by examiner

*Primary Examiner*—Tu X Nguyen
(74) *Attorney, Agent, or Firm*—Rosenberg, Klein & Lee

(57) ABSTRACT

In a multi-carrier and multi-rate CDMA system, a base station transmits an index tag to a number of mobile stations. The index tag has a length indicating a transmission rate and all index tags are nodes in a code tree. In the code tree, mother nodes and their child nodes block each other and are not assigned to the mobile stations at the same time. At the same time, index tags of nodes in the same level of the code tree map are orthogonal to each other. The mobile station constructs an index tag matrix according to the index tag. Then, the index tag matrix is multiplied with a generating matrix that is stored in every mobile station to generate a spreading factor matrix whose rows respectively correspond to different carriers.

15 Claims, 17 Drawing Sheets

| Gray Code $y_3y_2y_1y_0$ | Binary Code $x_3x_2x_1x_0$ | Decimal Value |
|---|---|---|
| 0001 | 0001 | |
| 0011 | 0010 | 2 |
| 0010 | 0011 | 3 |
| 0110 | 0100 | 4 |
| 0111 | 0101 | 5 |
| 0101 | 0110 | 6 |
| 0100 | 0111 | 7 |
| 1100 | 1000 | 8 |
| 1101 | 1001 | 9 |
| 1111 | 1010 | 10 |
| 1110 | 1011 | 11 |
| 1010 | 1100 | 12 |
| 1011 | 1101 | 13 |
| 1001 | 1110 | 14 |
| 1000 | 1111 | 15 |

Fig. 8

MULTICARRIER AND MULTIRATE CDMA SYSTEM

BACKGROUND OF THE INVENTION

1. Field of Invention

The invention relates to a spreading factor communication method and, in particular, to a spreading factor communication method that generates spreading codes.

2. Related Art

The rapid development of mobile phones all over the globe has spawned great advances in the wireless communication technology. The success of the widely used second generation (2G) mobile communication system nowadays does not only influence modern life, but also speeds up the development of the third generation (3G) mobile communication system. In the 3G wireless communications, important techniques include CDMA2000, the wideband-CDMA (W-CDMA) compatible with the 2.5 G GSM network, and the China TD-SCDMA, all based upon the code division multiple access (CDMA).

However, people are not completely satisfied with the so-called 3G technology. With higher demands for wireless communications and to provide better services, many international manufacturers have started researches in more advanced techniques, called the beyond 3G techniques. These techniques will fix problems in the 3G system. For example, they will increase the usage efficiency of the frequency spectrum, the bandwidth of transmissions, the transmission speed. They will further have time vision duplex (TDD), global roaming, and higher service quality.

For example, the high speed and multirate properties in the 3G system are those beyond the reach of a 2G system. However, in order to have higher bit transmission ability, multi-carrier modulation techniques have been proposed. This is because the multicarrier modulation techniques have the advantages of avoiding multipath attenuation and suppressing narrow column bandwidth interference. Incorporating the multicarrier modulation techniques into the CDMA technology is therefore an important part of the 3G wireless communications.

An issue that determines whether the beyond 3G wireless communication will be successful is how to effectively integrate the multicarrier modulation techniques with the original CDMA technology.

For example, in the spreading applications of one base station to multiple mobile stations, one mobile station has to use multiple spreading codes for encoding and decoding data in multiple carriers in order to have spreading data transmissions. In this case, to achieve the multirate transmission requirement, the base station has to allocate spreading codes of different lengths to mobile stations with different transmission speed needs or providing a mobile station with multiple spreading codes. To avoid interference among the spreading codes of different lengths, an ideal method is to let all mobile stations use spreading codes orthogonal to each other. Nonetheless, how to effectively allocate and transmit the spreading codes to the mobile stations determines the cost for constructing the whole communication system.

Since the communication bandwidth is very precious, directly transmitting spreading codes with a huge amount of data to the mobile stations during the communication process is very uneconomic. On the contrary, if all available spreading code tables, such as a whole code tree, are stored at the mobile stations, the cost of the equipment will increase, restricting its applications on the market.

In summary, how to find a spreading code generating and transmission method for the multicarrier and multirate CDMA system is a valuable work in the field.

SUMMARY OF THE INVENTION

An objective of the invention is to provide a multicarrier and multirate communication method that enables effective transmissions of spreading codes between the base station and mobile stations.

According to a preferred embodiment of the invention, the communication method is implemented on a CDMA multirate communication system and includes at least the following steps.

First, an index tag whose length determines a transmission rate is transmitted to several mobile stations. The mobile station constructs an index tag matrix according to the index tag. The index tag matrix is multiplied with a generating matrix to generate a spreading factor matrix. Each row of the index tag matrix corresponds to an associated row in the spreading factor matrix, while each row in the spreading factor matrix corresponds to a carrier. The spreading factor matrices are orthogonal to one another to prevent signal interference among the mobile stations. The mobile stations use the rows of the spreading factor matrix to decode spreading data on several carriers.

The index tags can be constructed according to the Gray code as nodes in a code tree. In other words, the base station only needs to transmit a Gray code to a mobile station for it to generate the corresponding index tag matrix accordingly. In an example of the Gray code tree construction, all mobile stations have the same generating matrix. One uses submatrices of the generating matrix for index tag matrices of different sizes because these generating matrices are merged into the same matrix.

Consequently, the invention has at least the following advantages. First, the base station can quickly transmit the spreading codes to mobile stations. At the same time, the mobile stations only need to store one generating matrix. Secondly, the disclosed device has a simple circuit. However, it supports the needs required by a multirate and multicarrier CDMA communication system. Moreover, the positions of index tags in the code tree help determining whether they will interfere with each other. Therefore, the base station can use a circuit to effectively allocate the spreading codes.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein:

FIG. 8 is a set of Gray code series;

DETAILED DESCRIPTION OF THE PREFERRED EMBODIMENT

In the following paragraphs, we use a multirate and multi-carrier CDMA communication system as an example to demonstrate features of the invention.

Figure 1:
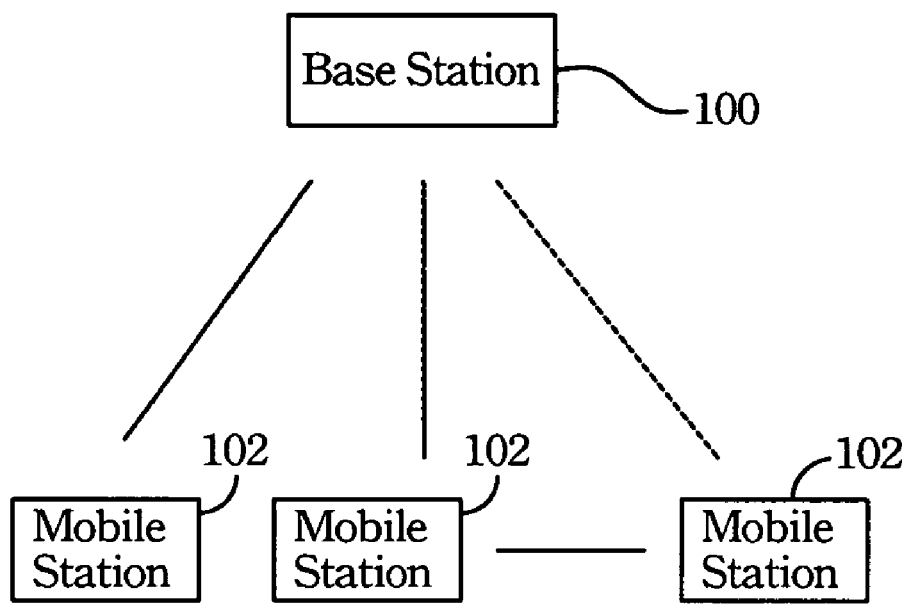
FIG. 1 is a schematic view of a communication system.

FIG. 1 shows that one base station 100 serves several mobile stations 102 in a region. In the applications of mobile communications, the mobile stations 102 often move around within the region. Therefore, the base station 100 does not always connect to the same mobile stations 102. These mobile stations 102 use different spreading codes to share the same carriers.

For example, if the bit to be transmitted to the mobile station A 102 is a (with the value of +1 or −1), the spreading code of it on the first carrier is (+1, −1). If the bit to be transmitted to the mobile station B 102 is b (with the value of +1 or −1), the spreading code of it on the first carrier is (+1, +1). The spreading factor in this example is 2. The chip code of a on the first carrier after spreading is (+a, −a); likewise, the chip code of b on the first carrier after spreading is (+b, +b). The sum of the chip codes of a and b is (a+b, −a+b). This is the spreading data sent out via the first carrier in a wireless method by the base station 100.

After the mobile station A 102 receives the spreading data from the first carrier, it is multiplied by the spreading code (+1, −1) characteristic of the mobile station A 102 to obtain a+b+a−b=2a. On the other hand, after the mobile station B 102 receives the spreading data from the first carrier, it is multiplied by the spreading code (+1, +1) characteristic of the mobile station B 102 to obtain a+b−a+b=2b. Therefore, even if data for different mobile stations 102 are in the air, each mobile station can readily restore the required data using the appropriate spreading code.

Analogously, if there are four spreading codes with low correlation coefficients, four mobile stations 102 can share the same bandwidth to transmit data a, b, c, and d without interfering with one another. If the four spreading codes are orthogonal to one another, the receiver will obtain respectively 4a, 4b, 4c, and 4d after decoding. However, a third party will obtain a random-like result with 4-dimensional interference due to the lack of the spreading codes. In other words, through careful selection of spreading codes, several mobile stations can share the same bandwidth for transmitting data. As long as the receiver has the corresponding spreading code, the data can be readily restored.

Figure 2:
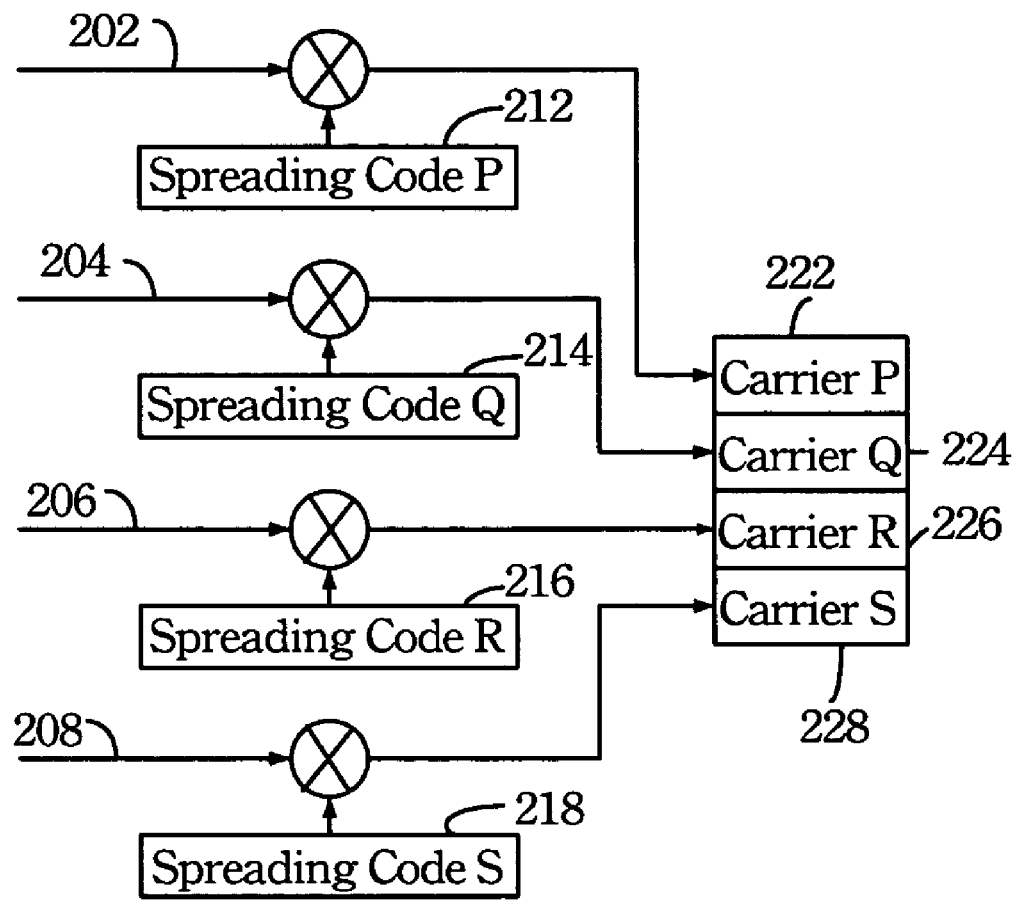
FIG. 2 is a schematic view of a multicarrier spreading system.

FIG. 2 schematically shows the spreading method of using four carriers to transmit data to a mobile station 102. The data 202, 204, 206, 208 to be spread are multiplied by the spreading codes 212, 214, 216, 218 for the four carriers before being sent to the four carriers 222, 224, 226, 228. The four carriers divide the original spectrum in a partially overlapping but orthogonal means in order to increase the data transmission capacity. This part belongs to the multiple frequency division modulation technology, such as the OFDM, and therefore is not repeated herein.

According to FIG. 2, four spreading codes 212, 214, 216, 218 are required for the four carriers for frequency spreading.

That is, we need a 4-row spreading factor matrix, each row of which corresponds to the spreading code of a carrier. Likewise, sixteen spreading codes are required when sixteen carriers are used for frequency spreading. Again, each row corresponds to the spreading code of a carrier.

To avoid signal interference among different mobile stations 102, the spreading codes sharing the same carrier are orthogonal to each other in the ideal situation. The smaller the spreading factor is (i.e. the shorter the length of the spreading code is), the faster transmission rate (e.g. for multimedia signal transmissions) it can support. On the other hand, the larger the spreading factor is (i.e. the longer the length of the spreading code is), the slower transmission rate (e.g. text signals) it can support.

In order to support multirate transmissions, mobile stations 102 using different transmission speeds are assigned with spreading codes of different lengths. Since the allocation of spreading codes of different lengths is relatively complicated, we use a code tree to organize them for more efficient spreading code allocation. We show how one construct a code tree as follows.

The generation of N×N 2-D orthogonal variable spreading codes $A_{N \times N}^{(i)}$ ($i \in \{1, 2, \ldots, N\}$) with a base N starts from two orthogonal matrices $A_{2 \times 2}^{(1)}$ and $A_{2 \times 2}^{(2)}$:

$$A_{2 \times 2}^{(1)} = \begin{bmatrix} + & + \\ + & - \end{bmatrix} \quad (A01)$$

$$A_{2 \times 2}^{(2)} = \begin{bmatrix} + & - \\ + & + \end{bmatrix} \quad (A02)$$

where $N = 2^k$, k is a positive integer, "+" represents "+1" and "−" represents "−1".

The steps of generating 2-D orthogonal codes with $N = 2^2$ (i.e. k=2) are schematically shown as follows:

$$A_{4 \times 4}^{(1)} = [A_{2 \times 2}^{(1)} \otimes A_{2 \times 2}^{(1)}] = \begin{bmatrix} + & + & + & + \\ + & - & + & - \\ + & + & - & - \\ + & - & - & + \end{bmatrix} \quad (A03)$$

$$A_{4 \times 4}^{(2)} = [A_{2 \times 2}^{(2)} \otimes A_{2 \times 2}^{(1)}] = \begin{bmatrix} + & + & - & - \\ + & - & - & + \\ + & + & + & + \\ + & - & + & - \end{bmatrix} \quad (A04)$$

$$A_{4 \times 4}^{(3)} = [A_{2 \times 2}^{(1)} \otimes A_{2 \times 2}^{(2)}] = \begin{bmatrix} + & - & + & - \\ + & + & + & + \\ + & - & - & + \\ + & + & - & - \end{bmatrix} \quad (A05)$$

$$A_{4 \times 4}^{(4)} = [A_{2 \times 2}^{(2)} \otimes A_{2 \times 2}^{(2)}] = \begin{bmatrix} + & - & - & + \\ + & + & - & - \\ + & - & + & - \\ + & + & + & + \end{bmatrix} \quad (A06)$$

where represents the Kronecker product of two matrices $B^{M_2 \times N_2} \otimes A^{M_1 \times N_1}$ defined by $$B \otimes A = \begin{bmatrix} b_{0,0}A & b_{0,1}A & \ldots & b_{0,N_2-1}A \\ b_{1,0}A & b_{1,1}A & \ldots & b_{1,N_2-1}A \\ \vdots & \vdots & \ddots & \vdots \\ b_{M_2-1,0}A & b_{M_2-1,1}A & \ldots & b_{M_2-1,N_2-1}A \end{bmatrix} \quad (A07)$$

Therefore, the 2-D orthogonal spreading code with a length of $N=2^k$ can be generally written as:

$$A^{(2i-1)}_{2^{k+1} \times 2^{k+1}} = [A^{(1)}_{2 \times 2} \otimes A^{(i)}_{2^k \times 2^k}] = \begin{bmatrix} A^{(i)}_{2^k \times 2^k} & -A^{(i)}_{2^k \times 2^k} \\ A^{(i)}_{2^k \times 2^k} & A^{(i)}_{2^k \times 2^k} \end{bmatrix} \quad (A08)$$

$$A^{(2i)}_{2^{k+1} \times 2^{k+1}} = [A^{(2)}_{2 \times 2} \otimes A^{(i)}_{2^k \times 2^k}] = \begin{bmatrix} A^{(i)}_{2^k \times 2^k} & A^{(i)}_{2^k \times 2^k} \\ A^{(i)}_{2^k \times 2^k} & -A^{(i)}_{2^k \times 2^k} \end{bmatrix} \quad (A09)$$

It should be pointed out that the $$A^{(1)}_{2 \times 2} \text{ and } A^{(2)}_{2 \times 2}$$

used above are only for the purpose of illustration. Any people skilled in the art can interchange or replace the columns and rows of $$A^{(1)}_{2 \times 2} \text{ and } A^{(2)}_{2 \times 2}.$$

As long as the outlined recursive generation method is satisfied, the aforementioned properties will remain. For example, one can rewrite "+" and "−" of $$A^{(1)}_{2 \times 2} \text{ and } A^{(2)}_{2 \times 2}$$

by "−" and "+," respectively. Moreover, the Kronecker product can be replaced by some other operation that can recursively generate the above-mentioned matrices.

Figure 3:
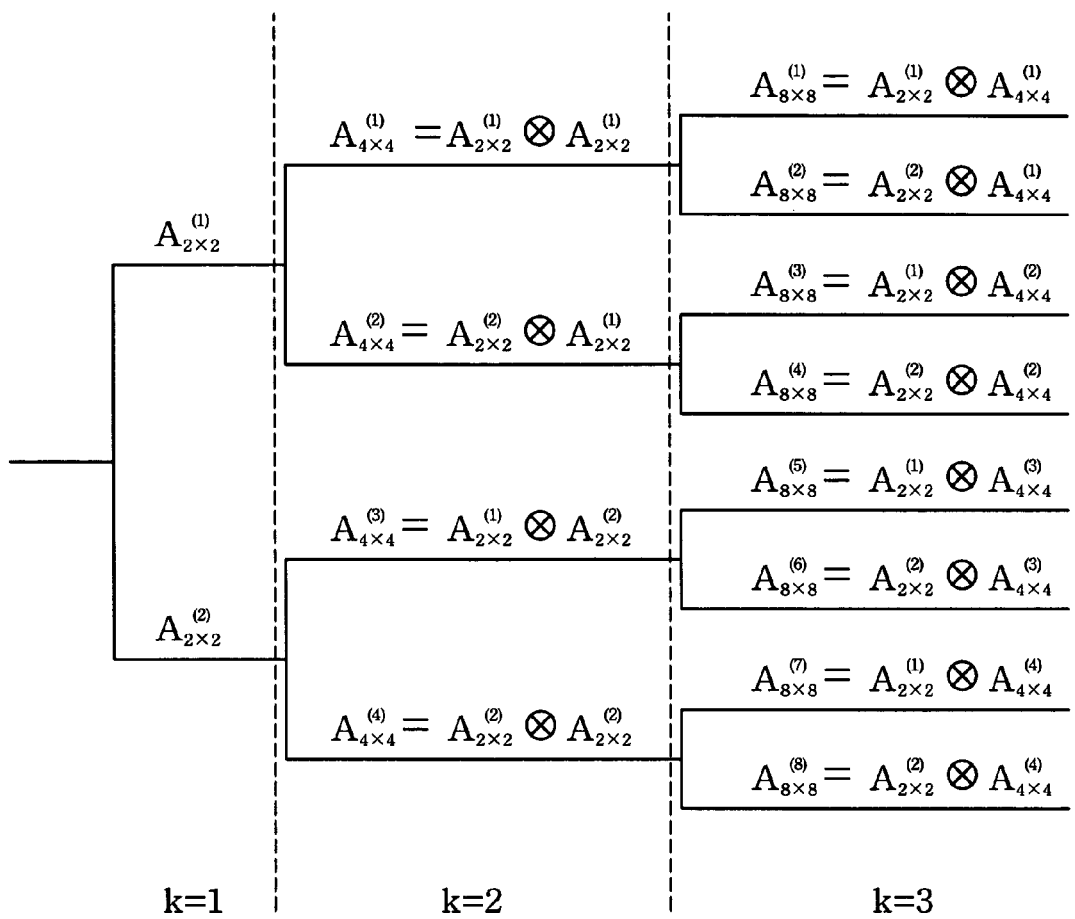
FIG. 3 shows the structure of a code tree.

FIG. 3 is the code tree of 2-D orthogonal variable spreading codes with $M=N=2^k$ being recursively used for generation to the third level (k=3). The roots of the tree structure are $$A^{(1)}_{2 \times 2} \text{ and } A^{(2)}_{2 \times 2}.$$

Moreover, the self-correlation of any 2-D orthogonal code is zero. The correlation of any two different 2-D orthogonal spreading codes is also zero.

The number of rows in the above spreading factor matrix is the number of carriers being used, the number of columns represents the spreading factor. The spreading factor needs not to be the same as the number of carriers. In the following, we show how one constructs the code tree in the case of M not equal to N.

The generation of M×N 2-D orthogonal variable spreading codes $$A^{(i)}_{M \times N} (i \in \{1, 2, \ldots, M\})$$

with a base N can also start from the two orthogonal matrices $$A^{(1)}_{2 \times 2} \text{ and } A^{(2)}_{2 \times 2}$$

in (A01) and (A02):

$$A^{(1)}_{2 \times 4} = [A^{(1)}_{2 \times 2} \ A^{(2)}_{2 \times 2}] = \begin{bmatrix} + & + & + & - \\ + & - & + & + \end{bmatrix} \quad (A10)$$

$$A^{(2)}_{2 \times 4} = [A^{(1)}_{2 \times 2} \ -A^{(2)}_{2 \times 2}] = \begin{bmatrix} + & + & - & + \\ + & - & - & - \end{bmatrix} \quad (A11)$$

where $M=2^k$, $N=2^{k+a}$, and $\alpha$ are positive integers.

Using M=2 and $N=2^{1+\alpha}$ ($\alpha \geq 1$), the roots (k=1) of 2-D orthogonal codes can be generated according to the recursive rules in Eqs. (A12) and (A13):

$$A^{(1)}_{2 \times 2^{1+a}} = [A^{(1)}_{2 \times 2^a} \ A^{(2)}_{2 \times 2^a}] \quad (A12)$$

$$A^{(2)}_{2 \times 2^{1+a}} = [A^{(1)}_{2 \times 2^a} \ -A^{(2)}_{2 \times 2^a}] \quad (A13)$$

If $2^{k+1} \times 2^{k+1}$ is replaced by $2^{k+1} \times 2^{k+1+\alpha}$ the recursive steps are very similar to Eqs. (A08) and (A09). Normally, $$A^{(2i-1)}_{2^{k+1} \times 2^{k+1+a}} \text{ and } A^{(2i)}_{2^{k+1} \times 2^{k+1+a}}$$

are generated from $$A^{(i)}_{2^k \times 2^{k+a}}.$$

That is, $$A^{(i)}_{2^k \times 2^k}$$

can be replaced by $$A^{(i)}_{2^k \times 2^{k+a}}$$

in Eqs. (A08) and (A09) for generating 2-D orthogonal codes.
Of course, the above-mentioned $$A^{(1)}_{2 \times 2} \text{ and } A^{(2)}_{2 \times 2}$$

are for illustration purpose only. One can find other orthogonal matrices to replace $$A_{2\times2}^{(1)} \text{ and } A_{2\times2}^{(2)}.$$

Through recursive relations, one can still obtain a code tree with the same effect.

FIG. 3 shows a code tree of 2-D orthogonal variable spreading codes with $M=2^k$, $N=2^{k+\alpha}(\alpha=1)$ being recursively used for generation to the third level (k=3). The roots of the tree structure are $$A_{2\times4}^{(1)} \text{ and } A_{2\times4}^{(2)}.$$

Figure 4:
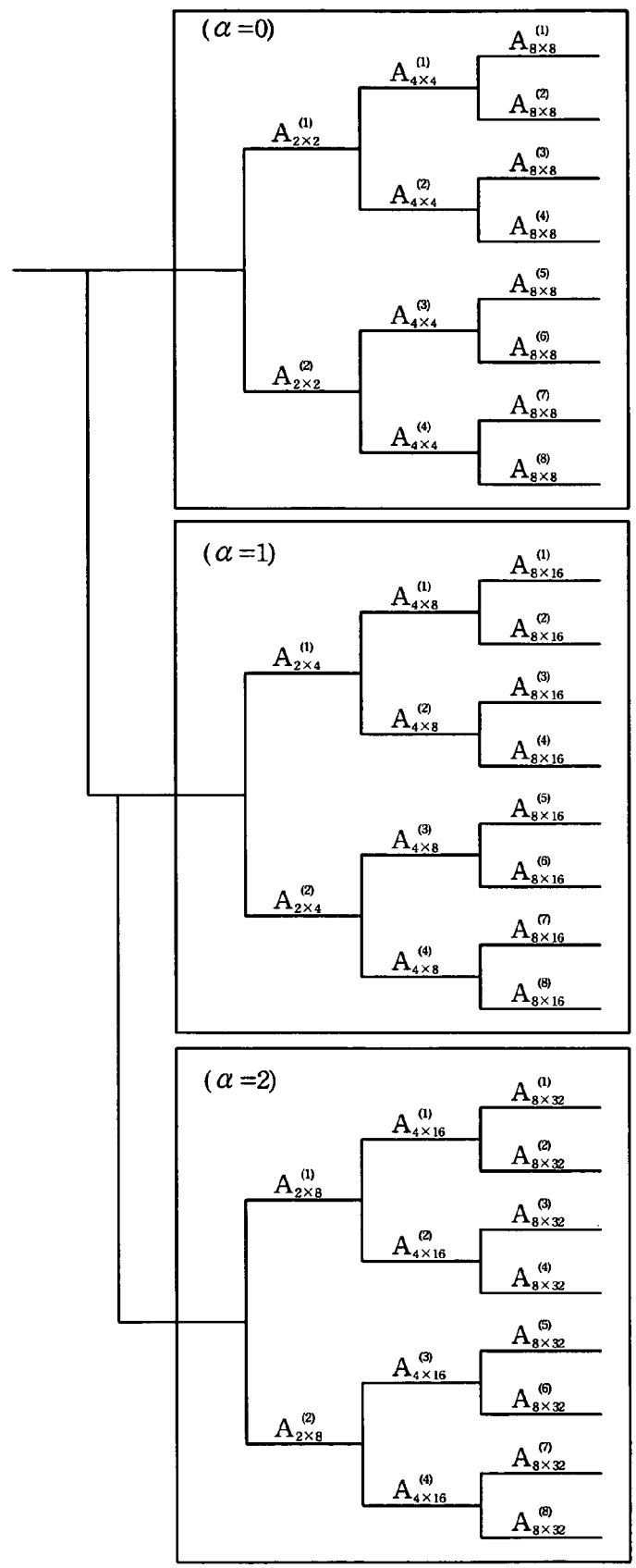
FIG. 4 shows the structure of another code tree.

Moreover, the self-correlation of any 2-D orthogonal code is zero. The correlation of any two different 2-D orthogonal spreading codes is also zero. M and N are 2 to any powers. Therefore, a complete tree structure can be constructed for the 2-D orthogonal codes, as shown in FIG. 4.

Figure 5:
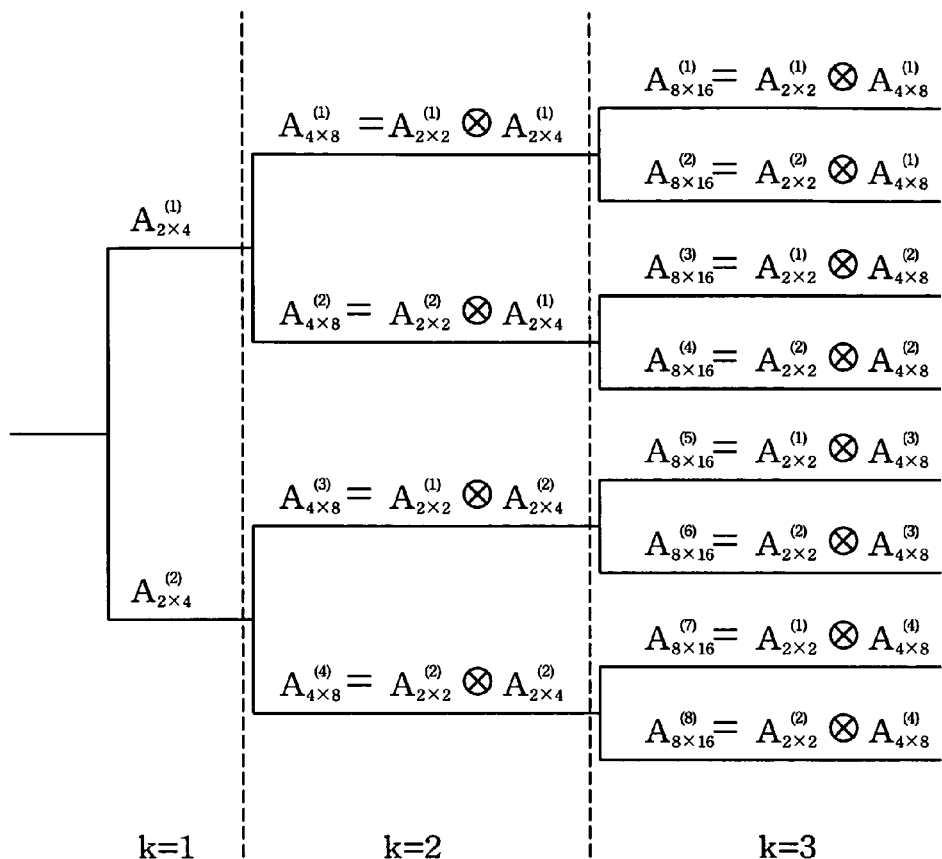
FIG. 5 shows the structure of yet another code tree.
Figure 6:
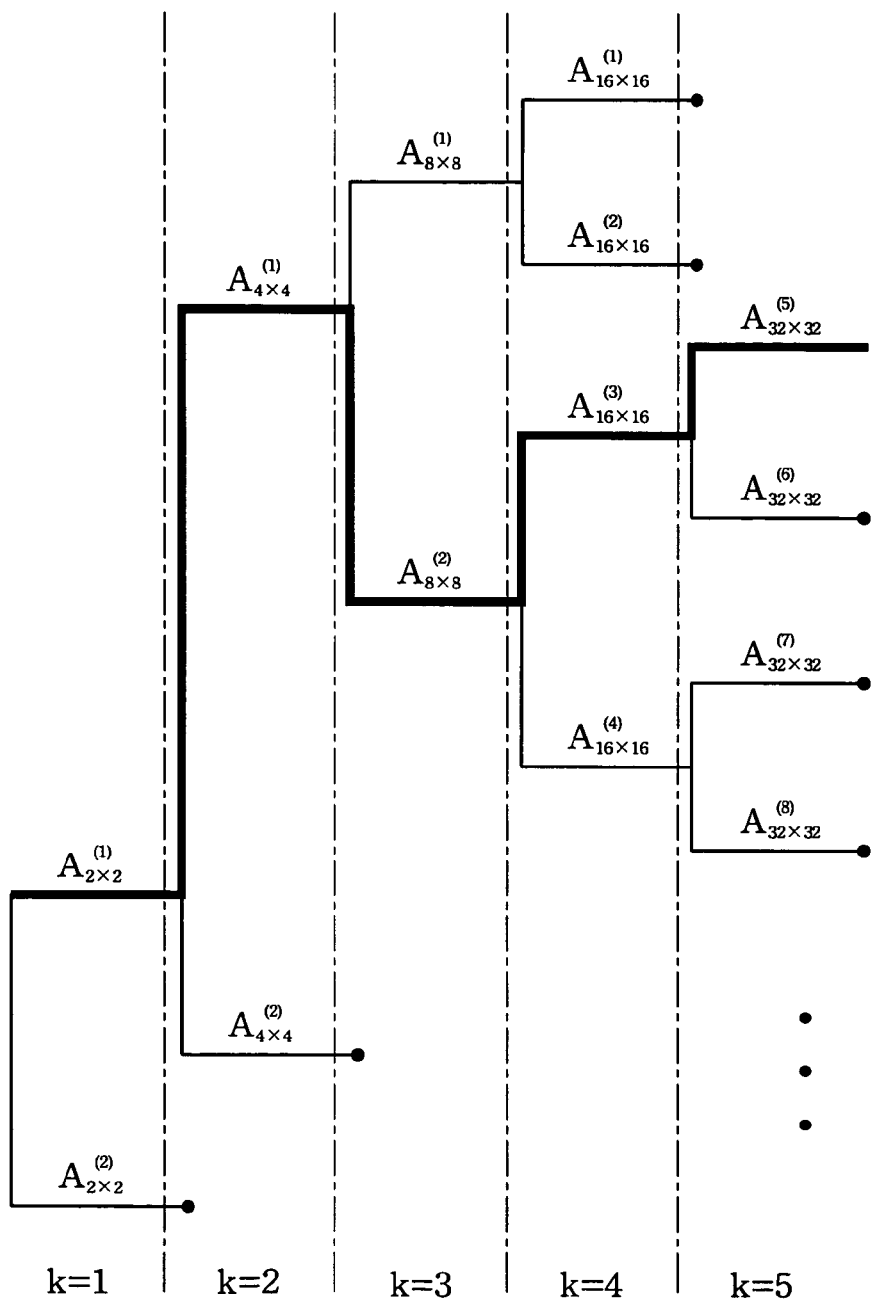
FIG. 6 shows the nodes that interfere with each other in the code tree.

FIG. 3 (M=N) and FIG. 5 (M<N) show that different codes are orthogonal to each other in the 2-D orthogonal code tree. In the 2-D orthogonal code $$A_{2^k\times2^{k+a}}^{(i)},$$

the superscript index i represents the 2-D code in the k-th level, where $1\leq i\leq M$. The code length of each level is the same. The 2-D codes in the (k+1)-th level are generated from the k-th level. Therefore, the 2-D orthogonal spreading codes can be recursively generated from the tree structure. Any two 2-D codes of the same level are orthogonal to each other. Two 2-D codes with the same $\alpha$ but in different levels are either mother and child codes or orthogonal to each other. If any two 2-D codes in a code tree have the same root, then the code at an upper level is called a mother code and the one at a lower level is called a child code. In FIG. 6, $$A_{2\times2}^{(1)}, A_{4\times4}^{(1)}, A_{8\times8}^{(2)}, \text{ and } A_{16\times16}^{(3)}$$

are the mother codes of $$A_{32\times32}^{(5)}, \text{ whereas } A_{4\times4}^{(1)}, A_{8\times8}^{(2)}, A_{16\times16}^{(3)}, \text{ and } A_{32\times32}^{(5)}$$

are the child codes of $$A_{2\times2}^{(1)}. \text{ Thus, } A_{2\times2}^{(1)}, A_{4\times4}^{(1)}, A_{8\times8}^{(2)}, A_{16\times16}^{(3)}, \text{ and } A_{32\times32}^{(5)}$$

are not orthogonal to each other.

In other words, these 2-D codes cannot be simultaneously used in the same channel. When a 2-D code is assigned, the others cannot be assigned as the mother codes or child codes of it. This ensures the orthogonality of the codes. If one arbitrarily assigns a larger spreading factor code to a mobile station that requires a lower speed, it will cause a problem for the assignment of smaller spreading factor codes. Suppose $$A_{8\times8}^{(2)}$$

is assigned to a mobile station, the child codes generated from $$A_{8\times8}^{(2)}, \{A_{16\times16}^{(3)}, A_{16\times16}^{(4)}, A_{32\times32}^{(5)}, \ldots, A_{32\times32}^{(8)}\},$$

cannot be assigned to the mobile stations in need of smaller speeds. Moreover, the mother codes of $$A_{8\times8}^{(2)}, \{A_{2\times2}^{(1)}, A_{4\times4}^{(1)}\},$$

also cannot be assigned to mobile stations in need to higher speeds. That is, the number of codes that can be used by other mobile stations is not only determined by the assigned codes in the code tree, it is also determined by the relation among the mother and child codes of these assigned codes.

The above-mentioned code tree has no problem in construction and indeed satisfies the requirements of building a multirate and multicarrier CDMA communication system. However, if the whole code tree exists in the mobile stations 102, it will increase the cost in circuit designs. On the other hand, it also wastes precious bandwidths if one directly sends the required spreading codes to the mobile stations 102 each time.

In the method disclosed herein below, one only needs to store a generating matrix at the mobile stations 102, not the whole code tree. The spreading code assignment is achieved by simply transmitting the index tags to the mobile stations 102.

Figure 7:
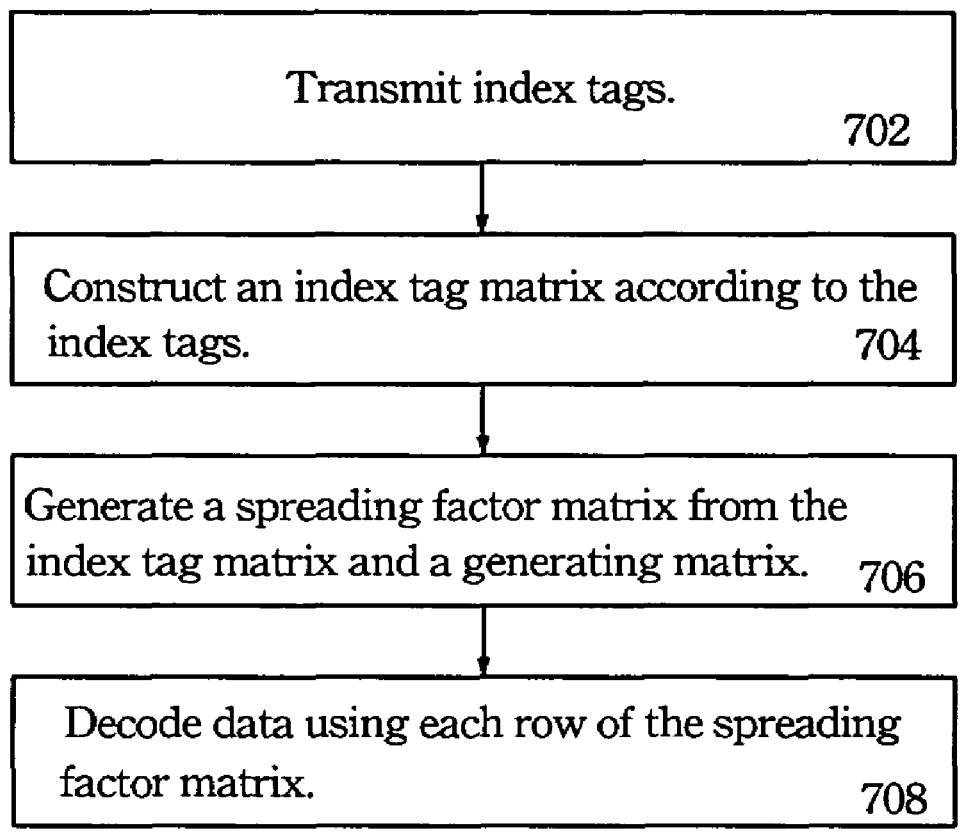
FIG. 7 is a flowchart of the disclosed embodiment.

FIG. 7 shows the method of using the index tags in order to assign the required spreading codes to the mobile stations 102 in a multirate and multicarrier CDMA communication system.

First, the index tags whose lengths indicate the required transmission rates, are transmitted to the corresponding mobile stations 102 (step 702). The mobile station 102 constructs an index tag matrix according to the received index tag (step 704). Afterwards, the mobile station uses the index tag matrix and an internal generating matrix to generate a spreading factor matrix (step 706). Each row of the index tag matrix corresponds to a row in the spreading factor matrix, each row of which corresponds to a carrier. The spreading factor matrices are orthogonal to each other. After completing the above steps, the mobile stations use the rows in the spreading factor matrix to decode data carried on several carriers (step 708).

In other words, the mobile stations 102 store only generating matrices in the method. When the base station 100 assigns the spreading codes to the mobile stations 102, there is no need to send the whole spreading factor matrix to the mobile stations 102. The spreading code assignment is achieved by sending an index tag.

Using the following means, one can map the index tags to the whole code tree. All the mobile stations 102 only need to keep a largest generating matrix because the generating matrices required for other levels of the code tree are submatrices of the largest generating matrix.

One way to construct the index tags is to use the Gray code series. The Gray code is a binary series whose adjacent numbers are only different by one bit. Basically, one set of Gray codes can be imagined as a Hamilton path of a super cube.

Figure 9:
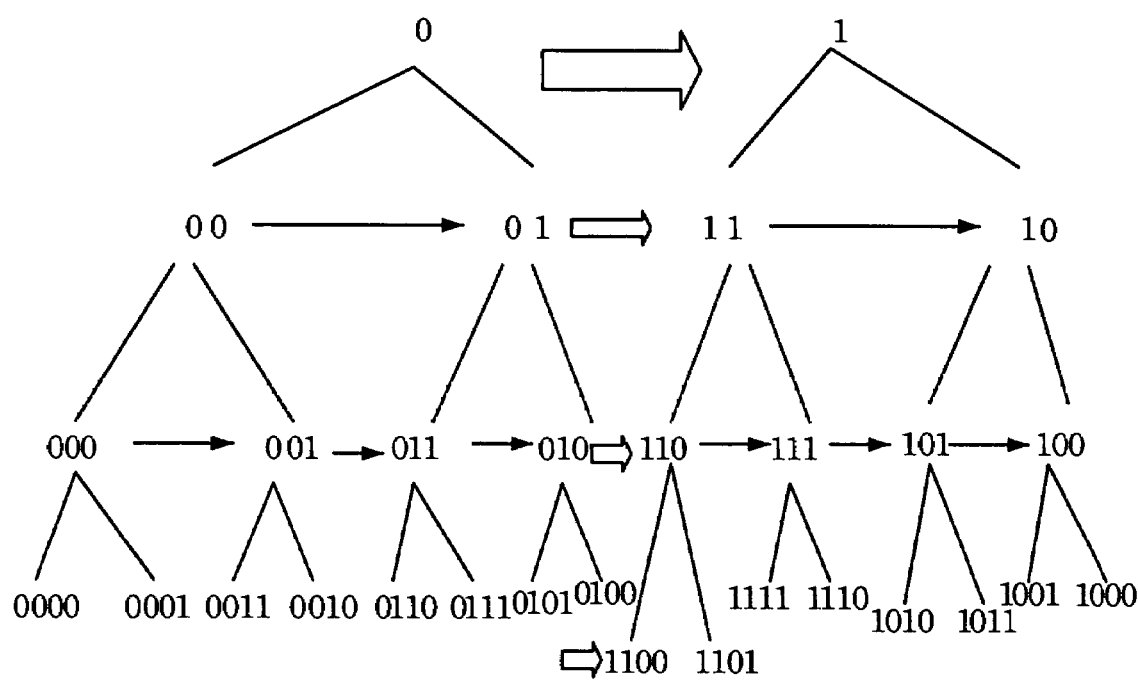
FIG. 9 is a code tree constructed from the Gray code series.

FIG. 9 shows how the index tags of the Gray code series are embedded into the code tree. One Hamilton path in the first level (LV=1) is 0->1. One Hamilton path in the second level (LV=2) is 00->01->11->10. Excluding the leftmost bit in each code, the order of rest bits is exactly going from left to right and then from right to left in the previous level (0->1=>1->0). Likewise, one Hamilton path in the third level (LV=3) is 000->001->011->010=>110->111->101->100. After excluding the leftmost bit of each code, the order of the rest bits is exactly going from left to right and then from right to left in the previous level (LV=2) (00->01->11->10=>10->11->01->00). The code tree from the fourth level on can be configured in a similar way.

In FIG. 9 and the above-mentioned configuring method, the code tree has a very special property. That is, one can determine whether two codes have the relation of mother and child codes simply from the beginning of the index tags. For example, two child nodes of 00 are 000 and 001. Of course, if the lengths of two codes are the same, they are at the same level of the code tree.

In the following, we explain how the index tags of the code tree correspond to the final spreading factor matrix. The roots of the code tree are 2-D orthogonal spreading codes with M=N. That is, the 2-D Walsh codes can be represented as:

$$D_{2\times 2}(0) = \begin{bmatrix} 0 & 0 \\ 0 & 1 \end{bmatrix} \quad (A14)$$

$$D_{2\times 2}(1) = \begin{bmatrix} 0 & 1 \\ 0 & 0 \end{bmatrix} \quad (A15)$$

where the subscript shows the matrix size, (0) and (1) are the indices of two codes in the first level. "0" and "1" in Eqs. (A14) and (A15) represent "+" and "−" of (A01) and (A02), respectively.

Through the correspondence means disclosed above, 00 in the first row of (A14) is marked as the Gray code 0 and 01 in the second row as 1. Likewise, 01 in the first row of (A15) is marked as the Gray code 1 and 00 in the second row as 0. Therefore, the index tag matrix of (A14) and (A15) are expressed as:

$$T_1^{(0)} = \begin{bmatrix} 0 \\ 1 \end{bmatrix} \quad (A16)$$

$$T_1^{(1)} = \begin{bmatrix} 1 \\ 0 \end{bmatrix} \quad (A17)$$

where the subscript is the first level. The superscript (0) and (1) are the indices of the two codes in the first level.

Figure 10:
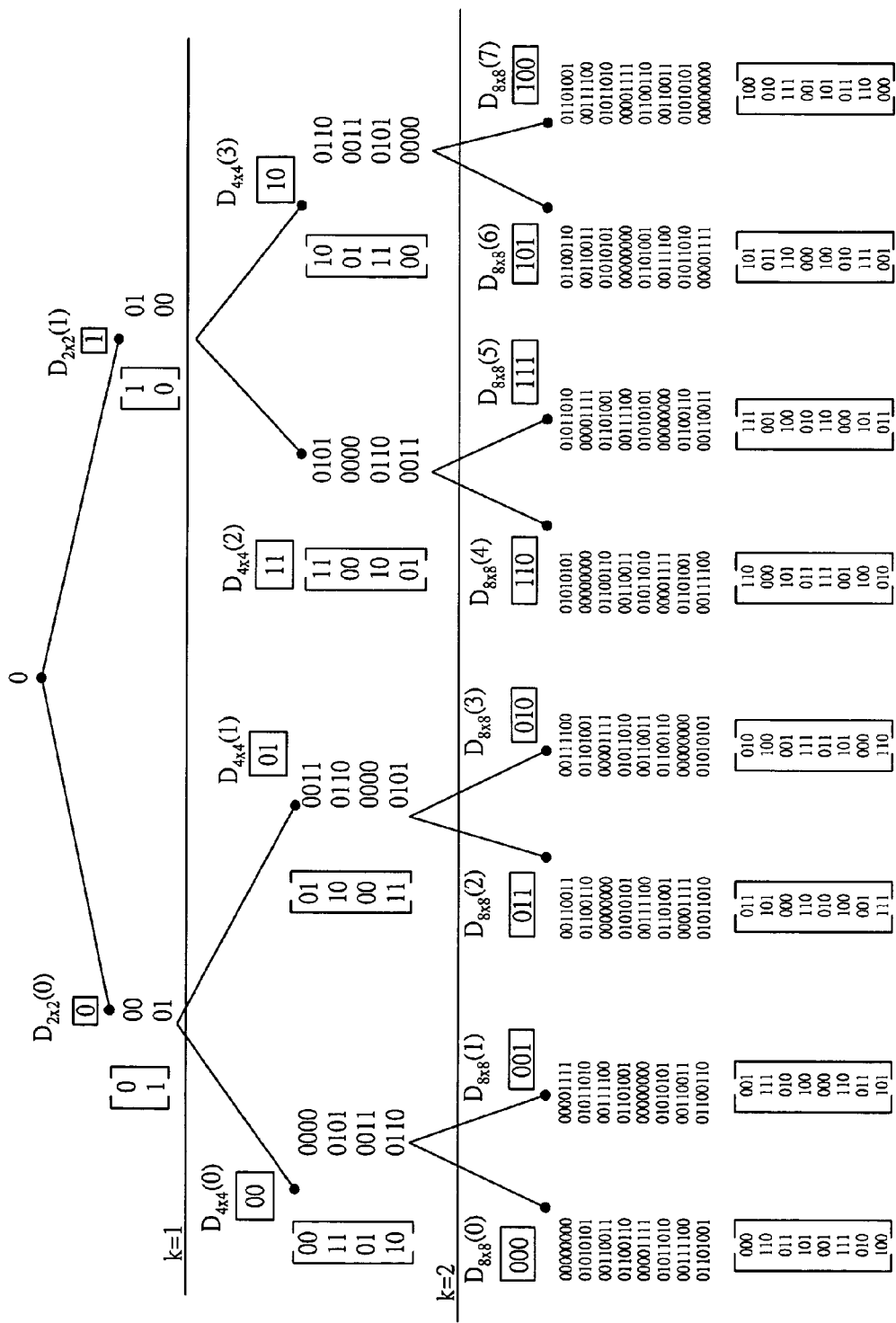
FIG. 10 shows a code tree structure.

The code tree of 2-D orthogonal spreading codes can be marked with the corresponding index tag matrices or the 1-D Gray code index in order to show whether two codes have the relation of mother and child codes. As shown in FIG. 10, 0, 1, 00, 01, ...

are the Gray indices. The purpose of these codes is to determine whether the Gray code index of some code is the header of that of another code.

FIG. 10 shows a code tree along with its index tags, index tag matrices, and spreading codes. For example, the Gray code index

01 is the header of 011 and 010.

Therefore, we know the 2-D orthogonal spreading code $D_{4\times 4}$(1) is the mother code of $D_{8\times 8}$(2) and $D_{8\times 8}$(3) Moreover, one can find another method for generating the index tag matrix in FIG. 10. First, between any two adjacent two levels (k≧1), the relation between the index tag matrices of 2-D orthogonal spreading codes with index code tags being all 0 can be expressed as:

$$T_{k+1}^{(0)} = \begin{bmatrix} T_k^{(0)} & \begin{array}{c} 0_{2^{k-1}} \\ 1_{2^{k-1}} \end{array} \\ \hline T_k^{(0)} & \begin{array}{c} 1_{2^{k-1}} \\ 0_{2^{k-1}} \end{array} \end{bmatrix} \quad (A18)$$

where $T_k^{(0)}$ and $T_{k+1}^{(0)}$ are the Gray index matrices of the 2-D orthogonal spreading codes with the Gray index tags in the k-th and (k+1)-th level being all 0. $0_{2^{k-1}}$ and $1_{2^{k-1}}$ represent the $2^{k-1}$ vectors with elements being all 0 and all 1, respectively. Therefore, one can obtain the index tag matrix with all levels of index tags being 0 from (A18). Using the 1-D index tag, one can then obtain all the index tag matrices of the level.

For example, suppose one wants to obtain the Gray index matrix of the 2-D orthogonal spreading code with the Gray code indices 01 and 01 in the second level (k=2). First, $T_2^{(0)}$ is obtained from $T_1^{(0)}$. However, $$T_2^{(0)} = \begin{bmatrix} T_1^{(0)} & \begin{array}{c} 0_1 \\ 1_1 \end{array} \\ \hline T_1^{(0)} & \begin{array}{c} 1_1 \\ 0_1 \end{array} \end{bmatrix} = \begin{bmatrix} 0 & 0 \\ 1 & 1 \\ \hline 0 & 1 \\ 1 & 0 \end{bmatrix} \quad (A19)$$

We see that the Gray code indices of $D_{4\times 4}$(0) and $D_{4\times 4}$(1) are 00 and 01, respectively. These two tags differ by one bit, the second bit. Therefore, one can perform the binary complement operation on the second column of $T_2^{(0)}$, obtaining the Gray index matrix $D_{4\times4}(1)$.

$$T_2^{(1)} = \begin{bmatrix} 0 & 1 \\ 1 & 0 \\ 0 & 0 \\ 1 & 1 \end{bmatrix} \quad (A20)$$

We also see that the index tag of $D_{4\times4}(2)$ is

11, which is different from that of $D_{4\times4}(0)$,

00, by two bits. Therefore, one can perform the complement operation on $T_2^{(0)}$. The result is the index tag matrix $D_{4\times4}(2)$.

$$T_2^{(2)} = \overline{T_2^{(0)}} = \begin{bmatrix} 1 & 1 \\ 0 & 0 \\ 1 & 0 \\ 0 & 1 \end{bmatrix} \quad (A21)$$

In each level, the index tag matrices differ for different index tags. In the example disclosed herein, one only need to determine the first index tag matrix on the left of each level. Other index tag matrices can be obtained by adding the index tags to the first index tag matrices. That is, each index tag has its own index tag matrix. Each row of the index tag matrix corresponds to the spreading code used in some carrier.

After obtaining the index tag matrices, a generating matrix is stored to rapidly obtain the spreading codes so that the index tag matrix multiplied by the generating matrix gives the spreading codes. In this example, the relation between the generating matrices of any two adjacent levels ($k \geq 1$) is $$G_{k+1} = \left[ \begin{array}{c|c} G_k & \overline{G_k} \\ \hline 0_{2^k} & 1_{2^k} \end{array} \right] \quad (A22)$$

where $G_k$ and $G_{k+1}$ are the generating matrices in the k-th and (k+1)-th levels. $\overline{G_k}$ is the binary complement of $G_k$. $0_{2^k}=(0,0,\ldots,0)$ and $1_{2^k}=(1,1,\ldots,1)$ represent $2^k$ vectors with elements being all 0 and all 1, respectively.

The generating matrices of all the levels are recursively produced using (A22). That is, the generating matrix $G_2$ of the second level is obtained from the generating matrix $G_1$ of the first level. Likewise, the generating matrix $G_3$ of the third level is obtained from the generating matrix $G_2$ of the second level, and so on.

$$G_1 = [0 \quad 1] \quad (A23)$$

$$G_2 = \left[ \begin{array}{c|c} G_1 & \overline{G_1} \\ \hline 0_2 & 1_2 \end{array} \right] = \left[ \begin{array}{cc|cc} 0 & 1 & 1 & 0 \\ 0 & 0 & 1 & 1 \end{array} \right] \quad (A24)$$

$$G_3 = \left[ \begin{array}{c|c} G_2 & \overline{G_2} \\ \hline 0_4 & 1_4 \end{array} \right] = \left[ \begin{array}{cccc|cccc} 0 & 1 & 1 & 0 & 1 & 0 & 0 & 1 \\ 0 & 0 & 1 & 1 & 1 & 1 & 0 & 0 \\ 0 & 0 & 0 & 0 & 1 & 1 & 1 & 1 \end{array} \right] \quad (A25)$$

Up to now, we have explained how to generate the index tags, the index tag matrices, and the generating matrices. In the following, we explain to how use an actual circuit to accomplish the above ideas.

Suppose the block code of (N,K) represents a set of $2^K$ code words of length N. Any linear code of (N,K) can be generated using a K×N generating matrix G. In the 1-D orthogonal spreading codes, the $2^k$ codes in the k-th level are generated from the linear codes of $(2^k, k)$. This idea can be generalized to 2-D orthogonal spreading codes. Therefore, the j-th orthogonal spreading code in the k-th level can be generated using the following formula:

$$D_{2^k \times 2^k}(j) = T_k^{(j)} \cdot G_k \quad (A26)$$

That is, $$\begin{bmatrix} d_{k,0,0}^{(j)} & d_{k,0,1}^{(j)} & \cdots & d_{k,0,2^k-1}^{(j)} \\ d_{k,1,0}^{(j)} & d_{k,1,1}^{(j)} & \cdots & d_{k,1,2^k-1}^{(j)} \\ \vdots & \vdots & \ddots & \vdots \\ d_{k,2^k-1,0}^{(j)} & d_{k,2^k-1,1}^{(j)} & \cdots & d_{k,2^k-1,2^k-1}^{(j)} \end{bmatrix} = \begin{bmatrix} t_{k,0,0}^{(j)} & t_{k,0,1}^{(j)} & \cdots & t_{k,0,k-1}^{(j)} \\ t_{k,1,0}^{(j)} & t_{k,1,1}^{(j)} & \cdots & t_{k,1,k-1}^{(j)} \\ \vdots & \vdots & \ddots & \vdots \\ t_{k,2^k-1,0}^{(j)} & t_{k,2^k-1,1}^{(j)} & \cdots & t_{k,2^k-1,k-1}^{(j)} \end{bmatrix} \cdot \begin{bmatrix} g_{k,0,0} & g_{k,0,1} & \cdots & g_{k,0,2^k-1} \\ g_{k,1,0} & g_{k,1,1} & \cdots & g_{k,1,2^k-1} \\ \vdots & \vdots & \ddots & \vdots \\ g_{k,k-1,0} & g_{k,k-1,1}^{(j)} & \cdots & g_{k,k-1,2^k-1}^{(j)} \end{bmatrix} \quad (A27)$$

where $0 \leq j \leq 2^k - 1$, $0 \leq m \leq 2^k - 1$, and $0 \leq n \leq 2^k - 1$.

Suppose one wants to generate the 2-D Walsh code $D_{4\times4}(\mathbf{0})$ with the Gray code tag

00 in the second level (k=2). First, the Gray index matrix $T_2^{(0)}$ of $D_{4\times4}(\mathbf{0})$ is obtained from $T_1^{(0)}$ of $D_{2\times2}(\mathbf{0})$ according to Eq. (A24). However, $$T_2^{(0)} = \left[\begin{array}{c|c} T_1^{(0)} & \begin{array}{c} 0_1 \\ 1_1 \end{array} \\ \hline T_1^{(0)} & \begin{array}{c} 1_1 \\ 0_1 \end{array} \end{array}\right] = \left[\begin{array}{cc|cc} 0 & 0 \\ 1 & 1 \\ \hline 0 & 1 \\ 1 & 0 \end{array}\right] \quad (A28)$$

Furthermore, (A24) is the generating matrix of the second level (k=2). Therefore, the Gray index matrix of the code multiplied by the generating matrix of the level gives the required 2-D Walsh code:

$$D_{4\times4}(0) = T_2^{(0)} \cdot G_2 = \begin{bmatrix} 0 & 0 \\ 1 & 1 \\ 0 & 1 \\ 1 & 0 \end{bmatrix} \cdot \begin{bmatrix} 0 & 1 & 1 & 0 \\ 0 & 0 & 1 & 1 \end{bmatrix} \quad (A29)$$

$$= \begin{bmatrix} 0 & 0 & 0 & 0 \\ 0 & 1 & 0 & 1 \\ 0 & 0 & 1 & 1 \\ 0 & 1 & 1 & 0 \end{bmatrix}$$

Figure 11:
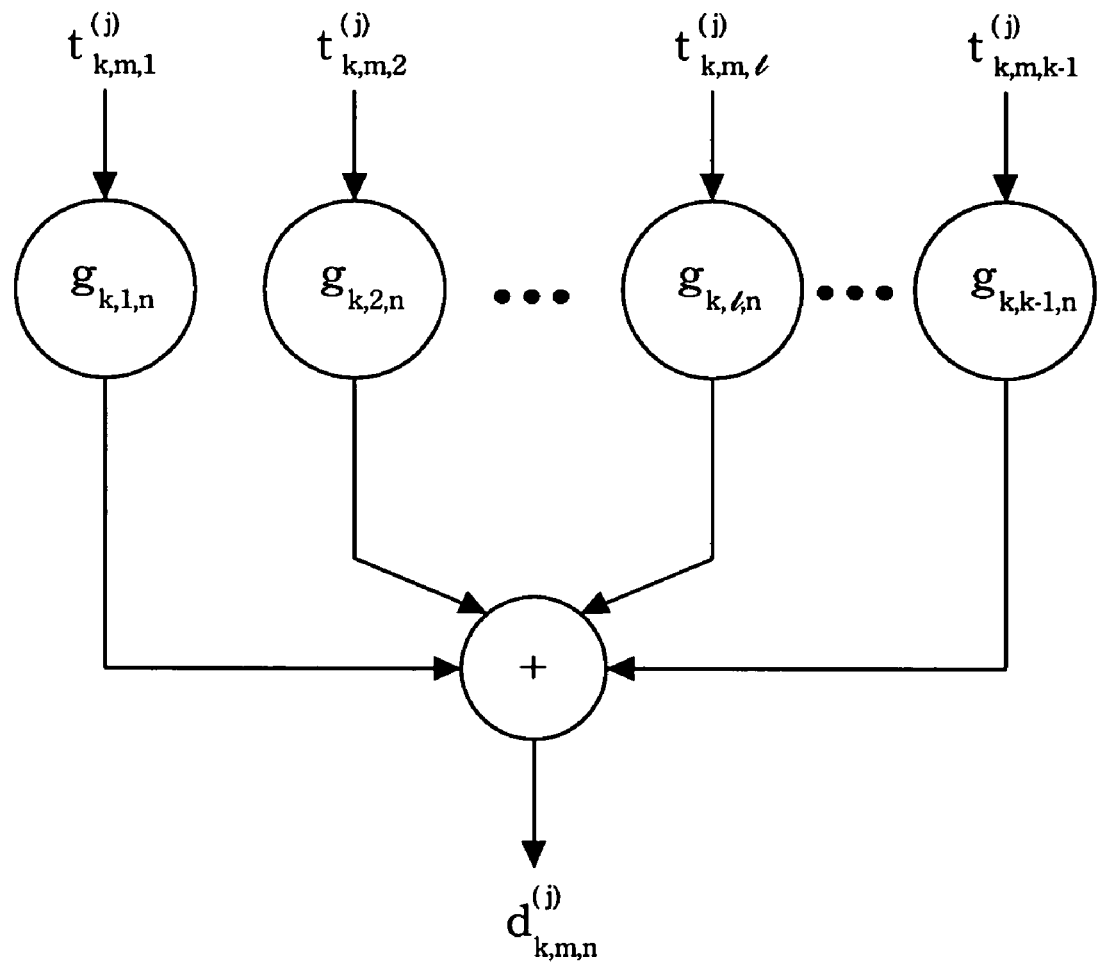
FIG. 11 is a schematic view of a single circuit.
Figure 12:
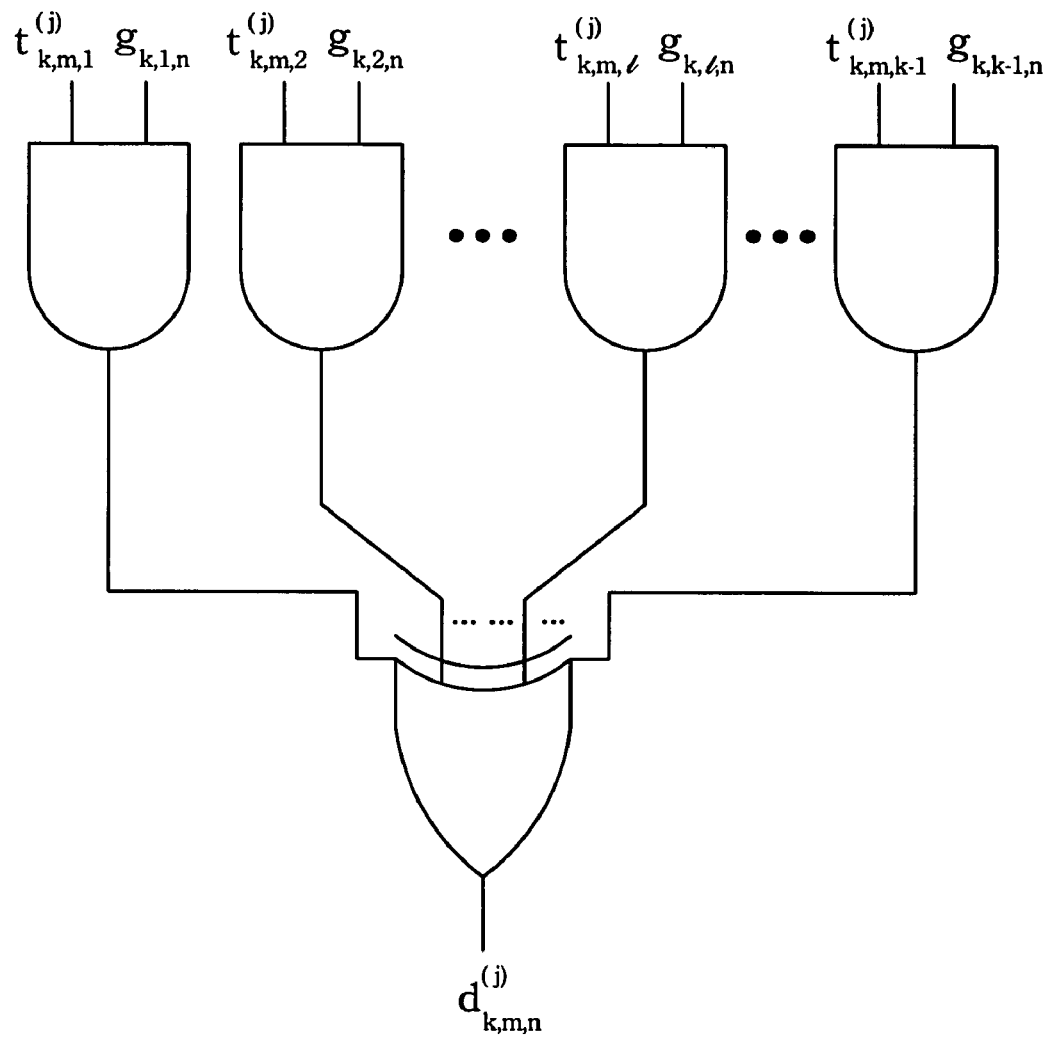
FIG. 12 is a schematic view of the logic in the disclosed single circuit.
Figure 13:
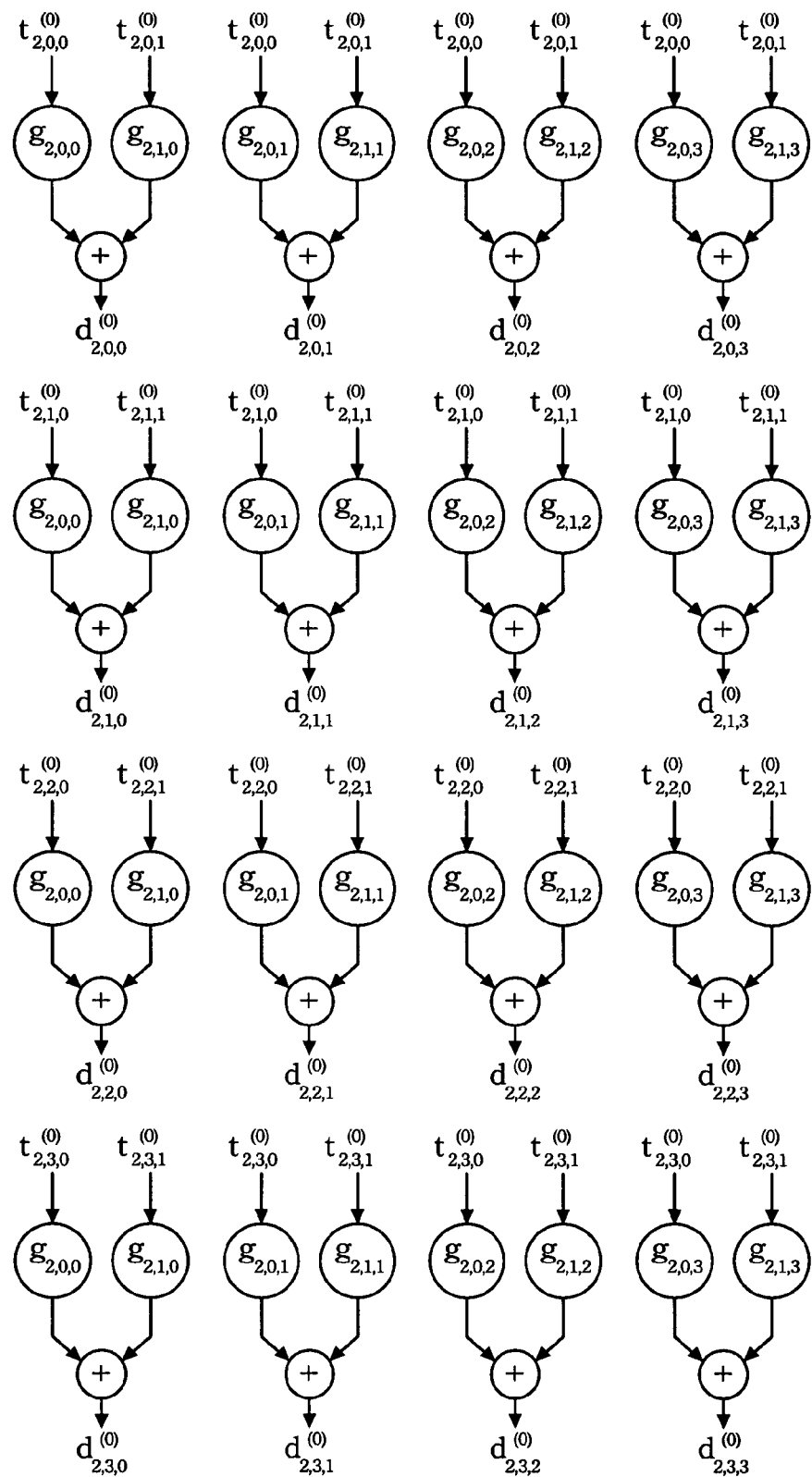
FIG. 13 is a schematic view of the circuit.
Figure 14:
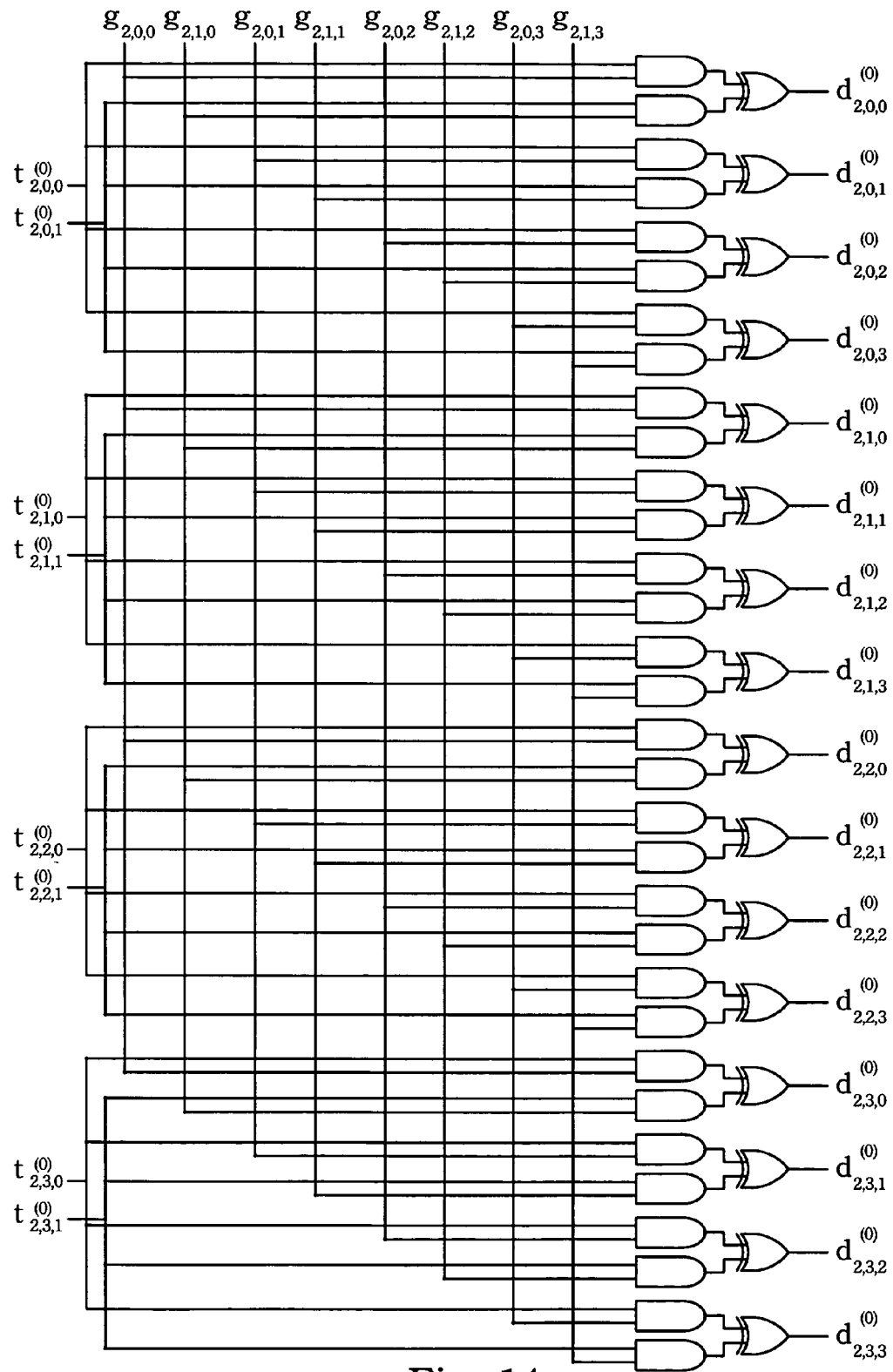
FIG. 14 is a schematic view of the logic in the disclosed circuit.

FIG. 11 shows a schematic view of the encoder of the (n,m) element of the j-th 2-D orthogonal variable spreading code in the k-th level according to the formula in Eqs. (A26) or (A27), where $0 \leq j \leq 2^k-1$, $0 \leq l \leq k-1$, $0 \leq m \leq 2^k-1$, and $0 \leq n \leq 2^k-1$. In the drawing, if $g_{k,l,n}=1$, then "→O→" means that the circuit is connected. On the other hand, if $g_{k,l,n}=0$, then the circuit is disconnected. "⊕" represents a modulo-2 adder. FIG. 12 is the circuit diagram of using a logic gate combinatory circuit to implement elements in 2-D orthogonal spreading codes. FIGS. 13 and 14 are, respectively, a schematic view and a circuit diagram of a complete encoder of 2-D orthogonal spreading codes with the index tag

00 in the second level.

Figure 15:
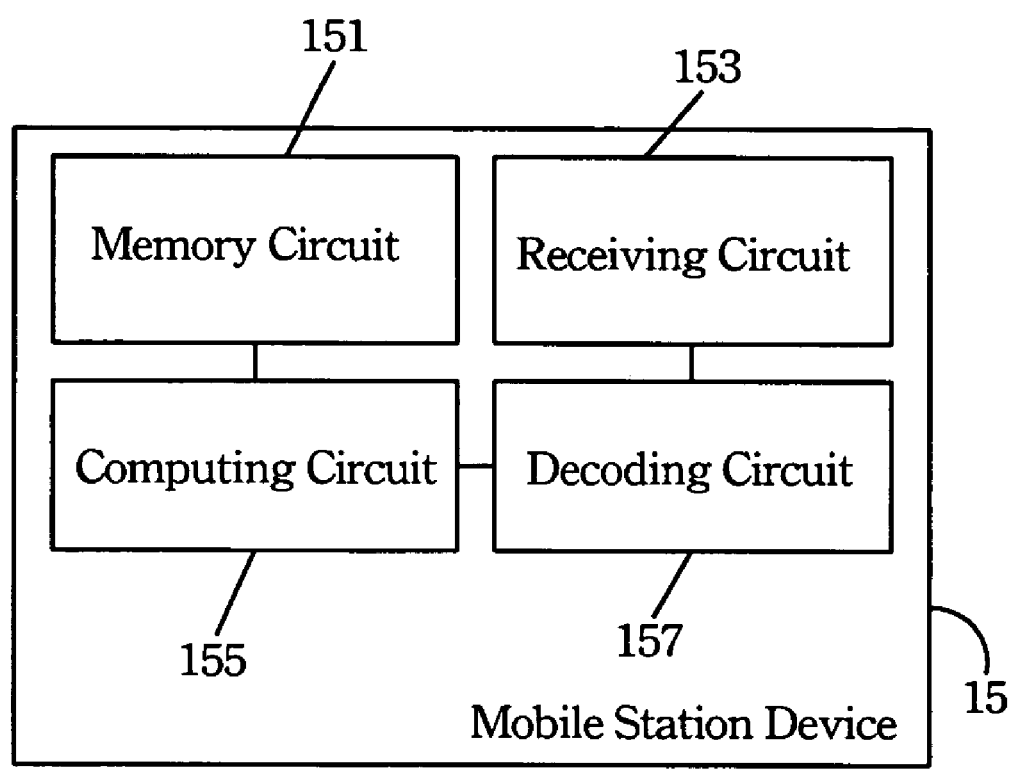
FIG. 15 is schematic view of the mobile station device.

FIG. 15 is the circuit diagram of the spreading communication receiver 15, such as a mobile phone, at a mobile station. The spreading communication receiver 15 is a CDMA communication system with multiple rates. It has a memory circuit 151, a receiver circuit 153, a computing circuit 155, and a decoding circuit 157. The memory circuit 151 stores the above-mentioned generating matrix. The receiving circuit 153 receives the spreading data on the multiple carriers and the above-mentioned index tag. The computing circuit 155 uses the index tag as the parameter to computer the index tag matrix. The index tag matrix and the generating matrix are combined to produce the spreading factor matrix, each row of which corresponds to one of the carriers. Moreover, the decoding circuit 155 uses the rows of the spreading factor matrix to decode the spreading data.

Figure 16:
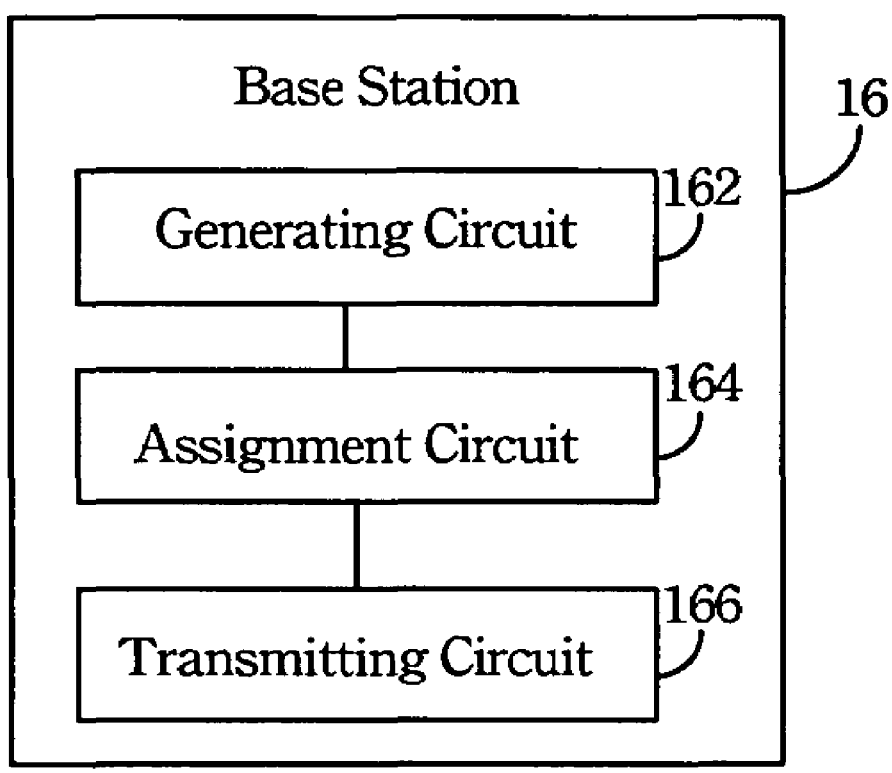
FIG. 16 is a schematic view of the base station.

In FIG. 16, the base station 16 is used in a CDMA communication system corresponding to several receivers. The base station 16 has a generating circuit 162, an assignment circuit 164, and a transmission circuit 166. The generating circuit 162 records several of the available index tags, each of which corresponds to a node of a code tree. Each index tag corresponds to an index matrix for generating a spreading factor matrix after being operated by a generating matrix. Each row of the spreading factor matrix allows a carrier to have spreading transmissions thereon. The spreading factor matrices on the carriers between the mother nodes and child nodes on the code tree and the nodes in the same level are orthogonal to each other. The assignment circuit 164 transmits the index tags of different lengths to the receivers in need to different transmission rates. The transmission circuit 166 transmits data using several carriers in the CDMA means according to the spreading factor matrices corresponding to the index tags used by the receivers.

Besides, when the number of carriers is smaller than the spreading factor, i.e. M is not equal to N, the roots in the code tree ($\alpha$=0) have to be changed in order for the encoder to generate the index tag matrices of all M≠N 2-D orthogonal variable spreading codes. The roots of the code tree ($\alpha$≠0) can be obtained from the modified roots using (A12) and (A13). However, the above-mentioned construction method can still be used to generate all the 2-D orthogonal spreading codes in the code tree. The 2-D orthogonal spreading codes generated using this method can be correctly used as long as it is in a synchronous system.

For example, in the $\alpha$=0 code tree, the original roots (A14) and (A15) can be changed to the 2-D orthogonal spreading codes in (A30) and (A31) as the new roots of the code tree. According to (A12) and (A13), we can obtain the roots (A32) and (A33) of the code tree ($\alpha$=1).

$$D_{2\times2}(0) = \begin{bmatrix} 0 & 0 \\ 0 & 0 \end{bmatrix} \quad (A30)$$

$$D_{2\times2}(0) = \begin{bmatrix} 0 & 0 \\ 1 & 1 \end{bmatrix} \quad (A31)$$

$$D_{2\times4}(0) = \begin{bmatrix} 0 & 0 & 0 & 0 \\ 0 & 0 & 1 & 1 \end{bmatrix} \quad (A32)$$

$$D_{2\times4}(1) = \begin{bmatrix} 0 & 0 & 1 & 1 \\ 0 & 0 & 0 & 0 \end{bmatrix} \quad (A33)$$

Besides, the above-mentioned construction method can use the Kronecker products of (A32), (A33) and (A14), (A15) to generate the 4×8 2-D orthogonal spreading codes in the second level. The operation procedure is as follows:

$$D_{4\times8}(0) = [D_{2\times2}(0) \otimes D_{2\times4}(0)] = \begin{bmatrix} 0 & 0 & 0 & 0 & 0 & 0 & 0 & 0 \\ 0 & 0 & 1 & 1 & 0 & 0 & 1 & 1 \\ 0 & 0 & 0 & 0 & 1 & 1 & 1 & 1 \\ 0 & 0 & 1 & 1 & 1 & 1 & 0 & 0 \end{bmatrix} \quad (A34)$$

$$D_{4\times8}(1) = [D_{2\times2}(1) \otimes D_{2\times4}(0)] = \begin{bmatrix} 0 & 0 & 0 & 0 & 1 & 1 & 1 & 1 \\ 0 & 0 & 1 & 1 & 1 & 1 & 0 & 0 \\ 0 & 0 & 0 & 0 & 0 & 0 & 0 & 0 \\ 0 & 0 & 1 & 1 & 0 & 0 & 1 & 1 \end{bmatrix} \quad (A35)$$

-continued $$D_{4\times 8}(2) = [D_{2\times 2}(0) \otimes D_{2\times 4}(1)] = \begin{bmatrix} 0 & 0 & 1 & 1 & 0 & 0 & 1 & 1 \\ 0 & 0 & 0 & 0 & 0 & 0 & 0 & 0 \\ 0 & 0 & 1 & 1 & 1 & 1 & 0 & 0 \\ 0 & 0 & 0 & 0 & 1 & 1 & 1 & 1 \end{bmatrix} \quad (A36)$$

$$D_{4\times 8}(3) = [D_{2\times 2}(1) \otimes D_{2\times 4}(1)] = \begin{bmatrix} 0 & 0 & 1 & 1 & 1 & 1 & 0 & 0 \\ 0 & 0 & 0 & 0 & 1 & 1 & 1 & 1 \\ 0 & 0 & 1 & 1 & 0 & 0 & 1 & 1 \\ 0 & 0 & 0 & 0 & 0 & 0 & 0 & 0 \end{bmatrix} \quad (A37)$$

Therefore, this construction method can be repeatedly used to generate all of the 8×16, 16×32, etc, 2-D orthogonal spreading codes in the third level, fourth level, etc. Thus, the index tag matrices of the M≠N 2-D orthogonal spreading codes can be generated using the encoder.

When using the encoder to generate M≠N 2-D orthogonal spreading codes (2×4, 2×8, 4×8, 4×16, etc), one has to know the index tag matrix associated with each code and the generating matrix of each level. The index tag matrix can be obtained using the index tag matrix of the above-mentioned 2-D Walsh code. That is, in order to obtain the index tag matrix of the M≠N 2-D orthogonal spreading code, one can extract the series in the odd row from the index tag matrix of the M=N 2-D Walsh code. The matrix thus formed is the index tag matrix of the corresponding 2-D orthogonal spreading code. For example, in the α=1 code tree, the 2×4 index tag matrix of the 2-D orthogonal spreading code can be obtained from the first row and the third row in the 4×4 index tag matrix of the 2-D Walsh code. The matrix thus formed is the 2×4 index tag matrix of the 2-D orthogonal spreading code. The 4×8 index tag matrix of the 2-D orthogonal spreading code can be obtained from the first, third, fifth, and seventh rows in the 8×8 index tag matrix of the 2-D Walsh code. The matrix thus formed is the 4×8 index tag matrix of the 2-D orthogonal spreading code. Following this reasoning, we obtain all the index tag matrices corresponding to the codes in the code tree. In the α=2 code tree, using the first and fifth rows of the 8×8 index tag matrix of the 2-D Walsh code we obtain the 2×8 index tag matrix of 2-D orthogonal spreading code. The 4×16, 8×32 etc. index tag matrices of 2-D orthogonal spreading codes can be obtained using the same method. Moreover, one can also use the index tag matrices of roots (i.e. the $2\times 2^{1+\alpha}$ 2-D orthogonal spreading codes) and Eq. (A38) or (A39) to obtain all the index tag matrices in the code tree.

$$T_{k+1}^{(j)} = \begin{bmatrix} T_k^{(j)} & 0_{2^{k-1}} \\ & 1_{2^{k-1}} \\ \hline T_k^{(j)} & 1_{2^{k-1}} \\ & 0_{2^{k-1}} \end{bmatrix} \quad (A38)$$

$$T_{k+1}^{(j)} = \begin{bmatrix} T_k^{(j)} & 1_{2^{k-1}} \\ & 0_{2^{k-1}} \\ \hline T_k^{(j)} & 0_{2^{k-1}} \\ & 1_{2^{k-1}} \end{bmatrix} \quad (A39)$$

where j is the index of 2-D orthogonal spreading codes with the range $0 \leq j \leq 2^k - 1$.

The generating matrix has to be a matrix with a number of columns same as the code length of the 2-D orthogonal spreading codes to be generated. For example, to generate a 4×8 2-D orthogonal spreading code, one should use a 3×8 generating matrix for (A25).

Figure 17:
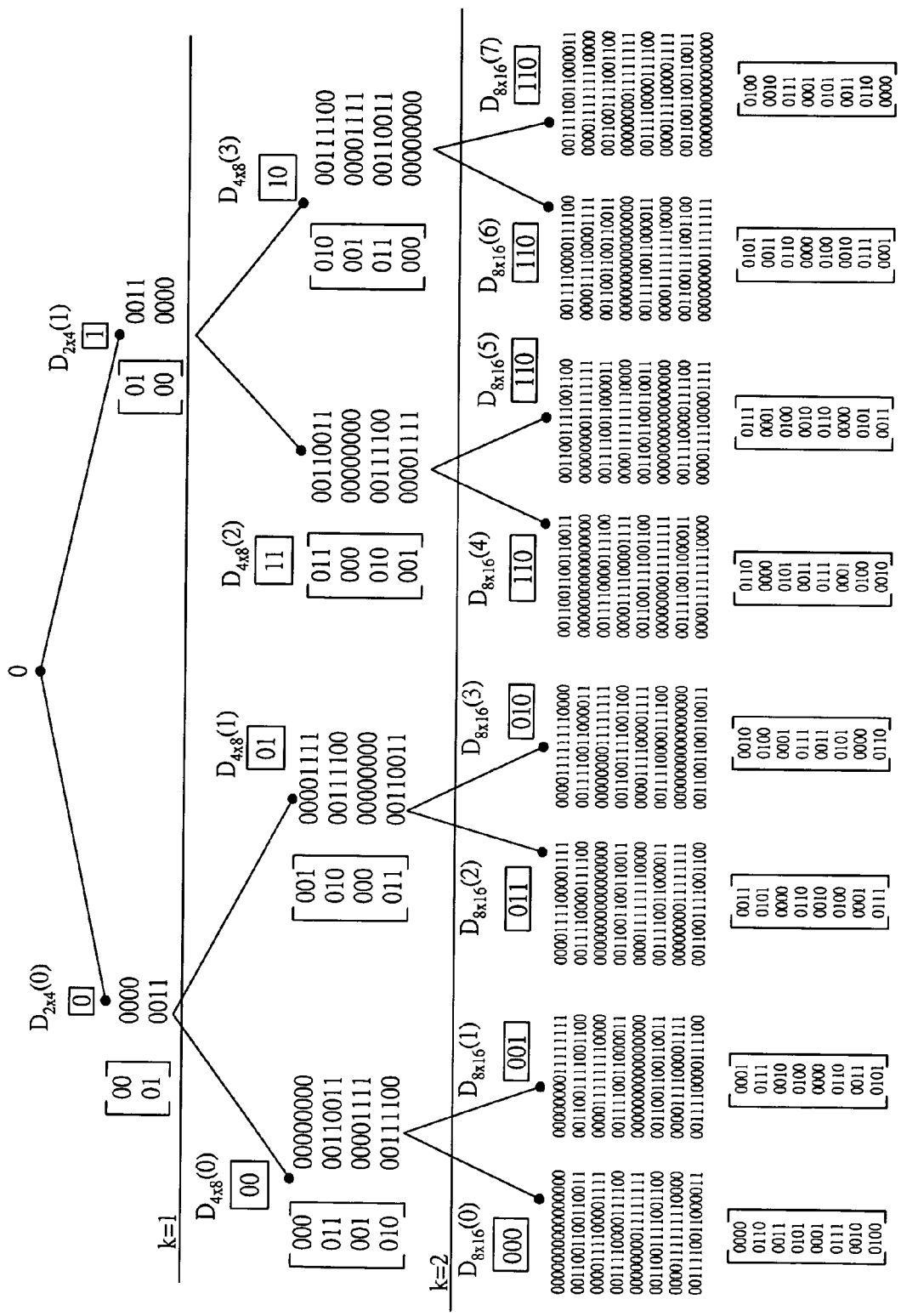
FIG. 17 is a schematic view of another code tree.

FIG. 17 shows the α=1 code tree of 2-D orthogonal spreading codes. The generating matrix of the first level (k=1) is (A24). The generating matrix of each level can be recursively generated using (A22). However, to generate the 2-D orthogonal spreading code $D_{4\times 8}(0)$ with the index tag

00 in the second level (k=2), one simply multiplies the index tag matrix of the code with the generating matrix of the second level. The index tag matrix is $$T_2^{(0)} = \begin{bmatrix} 0 & 0 & 0 \\ 0 & 1 & 1 \\ 0 & 1 & 1 \\ 0 & 1 & 0 \end{bmatrix} \quad (A40)$$

and the generating matrix of the level is $$G_2 = \begin{bmatrix} 0 & 1 & 1 & 0 & 1 & 0 & 0 & 1 \\ 0 & 0 & 1 & 1 & 1 & 1 & 0 & 0 \\ 0 & 0 & 0 & 0 & 1 & 1 & 1 & 1 \end{bmatrix} \quad (A41)$$

Therefore, the 2-D orthogonal spreading code is $$D_{4\times 8}(0) = T_2^{(0)} \cdot G_2 = \begin{bmatrix} 0 & 0 & 0 & 0 & 0 & 0 & 0 & 0 \\ 0 & 0 & 1 & 1 & 0 & 0 & 1 & 1 \\ 0 & 0 & 0 & 0 & 1 & 1 & 1 & 1 \\ 0 & 0 & 1 & 1 & 1 & 1 & 0 & 0 \end{bmatrix} \quad (A42)$$

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A communication method for a code division multiple access (CDMA) communication system comprising the steps of: transmitting an index tag, whose length determines a transmission rate, to a mobile station; the mobile stations's constructing an index tag matrix using the index tag; the mobile station's generating a spreading factor matrix according to the index tag matrix and a generating matrix, each row of the index tag matrix corresponding to an associated row in the spreading factor matrix, each row of the spreading factor matrix corresponding to a carrier, and the spreading factor matrices being orthogonal to each other; and the mobile station's using the rows of the spreading factor matrix to decode spreading data carried by a plurality of carriers.

2. The method of claim 1, wherein the index tag is a node of a code tree whose different levels represent different transmission rates and the spreading factor matrices in a same level of the code tree are orthogonal to each other.

3. The method of claim 2, wherein the spreading factor matrices in a same level of the code tree are orthogonal to each other.

4. The method of claim 3 further comprising the step of assigning the index tag of a node for data transmissions according to a required transmission rate and a usage state of the code tree.

5. The method of claim 4 further comprising the step of determining whether two index tags have the relation of mother and child nodes according to the index tag codes.

6. The method of claim 5, wherein the index tag is constructed according to a Gray code series.

7. The method of claim 6, wherein the code tree enables a plurality of the mobile stations to receive data simultaneously and the plurality of mobile stations store the generating matrix.

8. The method of claim 7, wherein the mobile stations multiplies the index tag matrix with the generating matrix to obtain the spreading factor matrix.

9. The method of claim 6, wherein the generating matrix corresponding to a mother node is a submatrix of the generating matrix corresponding to its child node.

10. The method of claim 1, wherein the mobile station is a mobile communication device used in the third generation (3G) mobile communications.

11. A spreading communication receiver for a multirate CDMA communication system, the device comprising: a memory circuit, which stores a generating matrix; a receiving circuit, which receives spreading data transmitted by a plurality of carriers and an index tag; a computing circuit, which uses the index tag as a parameter to compute an index tag matrix that is operated with the generating matrix to generate a spreading factor matrix, each row of which corresponds to one of the carriers; and a decoding circuit, which uses each row of the spreading factor matrix to decode the spreading data.

12. The spreading communication receiver of claim 11, wherein the index tag corresponds to a transmission rate and the computing circuit multiplies the index tag matrix with a submatrix of the generating matrix to obtain the spreading factor matrix according to the transmission rate.

13. The spreading communication receiver of claim 11 for a base station whose other spreading communication receivers store the generating matrix, the base station determining how to assign the index tags to the spreading communication receivers according to a code tree.

14. The spreading communication receiver of claim 13, wherein the spreading factor matrices derived from the index tags of the code tree are orthogonal to each other.

15. The spreading communication receiver of claim 11, wherein the nodes of the code tree are the index tags and the code tree is constructed according to a Gray code series.

* * * * *